United States Patent
Matsuda et al.

(10) Patent No.: US 10,144,250 B2
(45) Date of Patent: Dec. 4, 2018

(54) HEAVY DUTY PNEUMATIC TIRE

(71) Applicant: SUMITOMO RUBBER INDUSTRIES, LTD., Kobe-shi, Hyogo (JP)

(72) Inventors: Kae Matsuda, Kobe (JP); Atsushi Maehara, Kobe (JP); Shuji Kagimoto, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 567 days.

(21) Appl. No.: 14/825,347

(22) Filed: Aug. 13, 2015

(65) Prior Publication Data

US 2016/0059638 A1    Mar. 3, 2016

(30) Foreign Application Priority Data

Aug. 26, 2014 (JP) .................. 2014-171954
Aug. 26, 2014 (JP) .................. 2014-171955
Aug. 26, 2014 (JP) .................. 2014-171956
Aug. 26, 2014 (JP) .................. 2014-171957
Aug. 26, 2014 (JP) .................. 2014-171958

(51) Int. Cl.
*B60C 11/11* (2006.01)
*B60C 11/12* (2006.01)
*B60C 11/03* (2006.01)

(52) U.S. Cl.
CPC ....... *B60C 11/0311* (2013.01); *B60C 11/0306* (2013.01); *B60C 11/0309* (2013.01);
(Continued)

(58) Field of Classification Search
CPC .................. B60C 11/11; B60C 11/1281; B60C 2011/0353; B60C 2011/0365; B60C 2011/0346; B60C 2011/1213
See application file for complete search history.

(56) References Cited

U.S. PATENT DOCUMENTS

D647,468 S  * 10/2011  Weaver .................. D12/588
D675,981 S  *  2/2013  Kuwahara .............. D12/600
D754,590 S  *  4/2016  Kristen .................. D12/580
(Continued)

FOREIGN PATENT DOCUMENTS

EP  2 371 582 A1  10/2011
EP  2 390 113 A1  11/2011
(Continued)

OTHER PUBLICATIONS

Machine translation for Japan 2013-189099 (Year: 2017).*
(Continued)

*Primary Examiner* — Steven D Maki
(74) *Attorney, Agent, or Firm* — Birch, Stewart, Kolasch & Birch, LLP

(57) ABSTRACT

A heavy duty pneumatic tire comprises a tread portion provided with circumferentially continuously extending main grooves and axial grooves connecting between the main grooves to form blocks. The main grooves include a zigzag crown main groove disposed on each side of the tire equator, and a zigzag shoulder main groove disposed axially outside each crown main groove, wherein the groove width of the crown main groove is less than the groove width of the shoulder main groove. The axial grooves include crown axial grooves circumferentially dividing crown blocks disposed between the crown main grooves and each having a substantially hexagonal tread, and middle axial grooves circumferentially dividing middle blocks disposed between each crown main groove and the adjacent shoulder main groove and each having a substantially hexagonal tread, wherein the groove width of the middle axial grooves is more than the groove width of the crown axial grooves.

16 Claims, 6 Drawing Sheets

(52) U.S. Cl.
CPC .......... *B60C 11/1259* (2013.01); *B60C 11/11* (2013.01); *B60C 11/1281* (2013.01); *B60C 2011/0346* (2013.01); *B60C 2011/0353* (2013.01); *B60C 2011/0362* (2013.01); *B60C 2011/0365* (2013.01); *B60C 2011/1213* (2013.01); *B60C 2200/06* (2013.01)

(56) References Cited

U.S. PATENT DOCUMENTS

| | | | |
|---|---|---|---|
| D792,335 S * | 7/2017 | Dixon | D12/588 |
| 2012/0006456 A1* | 1/2012 | Koshio | B60C 11/11 152/209.18 |

FOREIGN PATENT DOCUMENTS

| | | | |
|---|---|---|---|
| JP | 05-246215 A | * | 9/1993 |
| JP | 2002-046426 A | * | 2/2002 |
| JP | 2004-224131 A | * | 8/2004 |
| JP | 2007-145209 A | | 6/2007 |
| JP | 2012-051504 A | * | 3/2012 |
| JP | 2013-189099 A | * | 9/2013 |

OTHER PUBLICATIONS

Machine translation for Japan 2012-051504 (Year: 2017).*
Machine translation for Japan 2004-224131 (Year: 2016).*
Machine translation for Japan 05-246215 (Year: 2014).*
Machine translation for Japan 2002-046426 (Year: 2014).*
Extended European Search Report dated Jan. 22, 2016, in European Patent Application No. 15182488.5.

* cited by examiner

HEAVY DUTY PNEUMATIC TIRE

BACKGROUND OF THE INVENTION

The present invention relates to a heavy duty pneumatic tire improved in uneven wear resistance.

Japanese Patent Application Publication No. 2007-145209 (hereinafter the patent document 1) discloses a heavy duty pneumatic tire, wherein the tire tread portion is provided with blocks having an irregular hexagonal shape.

If such heavy duty pneumatic tire is used as a drive axle tire, uneven wear so called center wear is liable to occur. Here, the center wear is such that blocks disposed in a tread crown region are worn earlier than blocks disposed in tread shoulder regions.

The center wear may be reduced by increasing the rigidity of blocks positioned in the crown region, for example, by decreasing the widths of grooves in the tread crown region dividing the concerned blocks.
Such tire is however, decreased in the drainage performance in the tread crown region, and the wet performance is deteriorated.

SUMMARY OF THE INVENTION

It is therefore, an object of the present invention to provide a heavy duty pneumatic tire, in which the resistance to uneven wear such as center wear can be improved without sacrificing the wet performance.

According to the present invention, a heavy duty pneumatic tire comprises:

a tread portion provided with circumferentially continuously extending main grooves and axial grooves connecting between the main grooves to form blocks, the main grooves including a zigzag crown main groove disposed on each side of the tire equator, and a zigzag shoulder main groove disposed axially outside each crown main groove, wherein the groove width of the crown main groove is less than the groove width of the shoulder main groove, and the axial grooves including crown axial grooves circumferentially dividing crown blocks disposed between the crown main grooves and each having a substantially hexagonal tread, and middle axial grooves circumferentially dividing middle blocks disposed between each crown main groove and the adjacent shoulder main groove and each having a hexagonal tread, wherein the groove width of the middle axial grooves is more than the groove width of the crown axial grooves.

Further, the heavy duty pneumatic tire according to the present invention may include the following features (1)-(13):
(1) the middle blocks each have a maximum axial width, and the crown blocks each have a maximum axial width more than the maximum axial width of the middle blocks;
(2) the crown axial grooves are inclined to one direction, and the middle axial grooves are inclined to one direction different from that of the crown axial grooves;
(3) each of the crown main grooves and the shoulder main grooves has axially inwardly projecting parts and axially outwardly projecting parts which are alternate in the tire circumferential direction,
the crown axial grooves extend from the inwardly projecting parts of one of the crown main grooves to the inwardly projecting parts of the other crown main groove, while inclining at an angle in a range of from 10 to 20 degrees with respect to the tire axial direction, and
the middle axial grooves extend from the outwardly projecting parts of the crown main groove to the inwardly projecting parts of the shoulder main groove, while inclining at an angle in a range of from 10 to 20 degrees with respect to the tire axial direction;
(4) each of the crown main grooves and the shoulder main grooves comprises alternate first oblique segments and second oblique segments inclined with respect to the tire circumferential direction at inclination angles in a range of from 15 to 25 degrees;
(5) each crown block is provided with a crown shallow groove extending across the width of the tread thereof, and having a groove depth less than the groove depth of the crown axial grooves;
(6) the crown shallow groove comprises a central portion inclined with respect to the tire axial direction toward one circumferential direction, and
the crown axial grooves are inclined with respect to the tire axial direction toward the other circumferential direction;
(7) the crown shallow groove comprises two end portions disposed on both sides of the central portion, and bent from the central portion to incline with respect to the tire axial direction toward said one circumferential direction.
(8) each end portion comprises a flared part in which the groove width increases toward its open end;
(9) the middle blocks are each provided with a middle shallow groove extending across the width of the tread thereof and having a groove depth less than the groove depth of the middle axial grooves;
(10) the middle shallow groove comprises a central portion inclined with respect to the tire axial direction toward one circumferential direction opposite to that of the middle axial grooves;
(11) the middle shallow groove comprises
a central portion inclined with respect to the tire axial direction toward one circumferential direction opposite to that of the middle axial grooves, and
two end portions disposed on both sides of the central portion, and bent from the central portion to incline toward the other circumferential direction;
(12) each end portion of the middle shallow groove comprises a flared part in which the groove width increases toward its open end;
(13) the axial grooves include shoulder axial grooves extending from each shoulder main groove to the adjacent tread edge to form shoulder blocks, and
the shoulder axial grooves have a groove width more than the groove width of the middle axial grooves.

The heavy duty pneumatic tire according to the present invention may include the following features (14)-(18):
(14) the axial grooves include shoulder axial grooves extending from each shoulder main groove to the adjacent tread edge to form shoulder blocks,
the middle axial grooves have a first inclination angle with respect to the tire axial direction,
the crown axial grooves have a second inclination angle with respect to the tire axial direction,
the shoulder axial grooves have a third inclination angle with respect to the tire axial direction, and
the first inclination angle is less than the second inclination angle and more than the third inclination angle;
(15) the second inclination angle of the crown axial grooves is less than 40 degrees;
(16) the third inclination angle of the shoulder axial grooves is less than 20 degrees;

(17) the difference between the first inclination angle of the middle axial grooves and the third inclination angle of the shoulder axial grooves is more than the difference between the first inclination angle of the middle axial grooves and the second inclination angle of the crown axial groove;
(18) the middle axial grooves have a first groove width, the crown axial grooves have a second groove width, the shoulder axial grooves have a third groove width,
the first groove width is more than the second groove width and less than the third groove width, and
the second groove width is not less than 5 mm.

The heavy duty pneumatic tire according to the present invention may include the following features (19)-(23):
(19) the lengths of edges of the tread of each crown block are set so that the edge length ratio between the lengths of any two of the edges of the tread falls within a range of from 0.8 to 1.3;
(20) the axial grooves include shoulder axial grooves extending from each shoulder main groove to the adjacent tread edge to form shoulder blocks,
the treads of the crown blocks have a first area, and the treads of the shoulder blocks have a second area less than the first area;
(21) the distance from the tire equator to the amplitude center line of the zigzag of the widthwise center line of the shoulder main groove is in a range of from 50% to 75% of a half tread width TW/2;
(22) a land ratio of a crown region between the crown main grooves is more than a land ratio of a shoulder region between each shoulder main groove and the adjacent tread edge;
(23) the lengths of edges of the tread of each middle block are set so that the edge length ratio between the lengths of any two of the edges of the tread falls within a range of from 0.8 to 1.3.

The heavy duty pneumatic tire according to the present invention may include the following features (24)-(26):
(24) the crown main grooves have a first groove width, the shoulder main grooves have a second groove width more than the first groove width,
the treads of the crown blocks have a first area, the treads of the shoulder blocks have a second area less than the first area, and
at least one of the two groove edges of each shoulder axial groove comprises
a straight portion extending straight from the shoulder main groove, and
a curved portion extending from the axially outer end of the straight portion to the tread edge and curved to increase the groove width of the shoulder axial groove.
(25) the tread of each shoulder block has corners positioned at both circumferential ends of the tread and having an internal angle of more than 90 degrees.
(26) the length of the straight portion is in a range of from 0.3 to 0.7 times the axial distance from the tread edge to the corner from which the straight portion extends.

The heavy duty pneumatic tire according to the present invention may include the following features (27)-(31):
(27) the middle blocks are each provided with a middle shallow groove extending across the width of the tread thereof and having a groove depth less than the groove depth of the middle axial grooves,
the middle shallow groove comprises
a central portion inclined with respect to the tire axial direction toward one circumferential direction opposite to that of the middle axial grooves, and
two end portions disposed on both sides of the central portion, and bent from the central portion to incline toward the other circumferential direction,
each end portion comprises a flared part in which the groove width increases toward its open end, and
the internal angle between the groove edges of the flared part of the middle shallow groove is not less than 30 degrees;
(28) the flared part of the middle shallow groove is located in a central part of the length of an edge of the tread of the middle block;
(29) in the tread of each middle block, the distance from the center of the groove width of the flared part at its open end to each end of the edge at which the flared part is opened, is in a range of from 0.3 to 0.7 times the length of the edge;
(30) in the tread of each middle block, the maximum groove width of the flared part at its open end is in a range of from 0.2 to 0.5 times the length of the edge at which the flared part is opened;
(31) the shortest distance from the inner end of the flared part to the edge of the tread of the middle block at which the flared part is opened is in a range of from 0.05 to 0.2 times the width of the middle block measured perpendicularly to said edge.

ADVANTAGEOUS EFFECTS OF INVENTION

In the heavy duty pneumatic tire according to present invention, as descried above, the tread portion is provided with the zigzag crown main grooves and the zigzag shoulder main grooves, and the groove width of the crown main grooves is smaller than the groove width of the shoulder main grooves. Accordingly, the middle blocks approach the crown blocks. Therefore, a load acting on the tread crown region is distributed to the crown blocks as well as the middle blocks, and the concentration on the crown blocks can be avoided. Accordingly, the early wear of the crown block can be prevented, and the resistance to center wear can be improved.

Further, since the crown blocks and the middle blocks are provided with the hexagonal treads having good rigidity balance, slippage between the crown block and the road surface becomes even over the entire tread area, and heel-and-toe wear is prevented, therefore, uneven wear resistance can be improved.

Furthermore, in the heavy duty pneumatic tire according to the present invention, although the crown main grooves are narrower than the shoulder main grooves, the groove width of the middle axial grooves are larger than the groove width of the crown axial grooves, therefore, drainage in the tread crown region is not decreased, and the wet performance of the tire can be maintained.

DEFINITIONS

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e.

JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENTS

Embodiments of the present invention will now be described in detail in conjunction with accompanying drawings.

The present invention is directed to a pneumatic tire for heavy duty vehicles such as truck/bus tire.

A pneumatic tire comprises a tread portion 2, a pair of axially spaced bead portions each with a bead core therein, a pair of sidewall portions extending between the tread edges Te and the bead portions, a carcass extending between the bead portions through the tread portion and sidewall portions, and a tread reinforcing cord layer disposed radially outside the carcass in the tread portion as well known in the art.

The tread portion 2 is provided with a plurality of main grooves 3 extending continuously in the tire circumferential direction.

Figure 1:
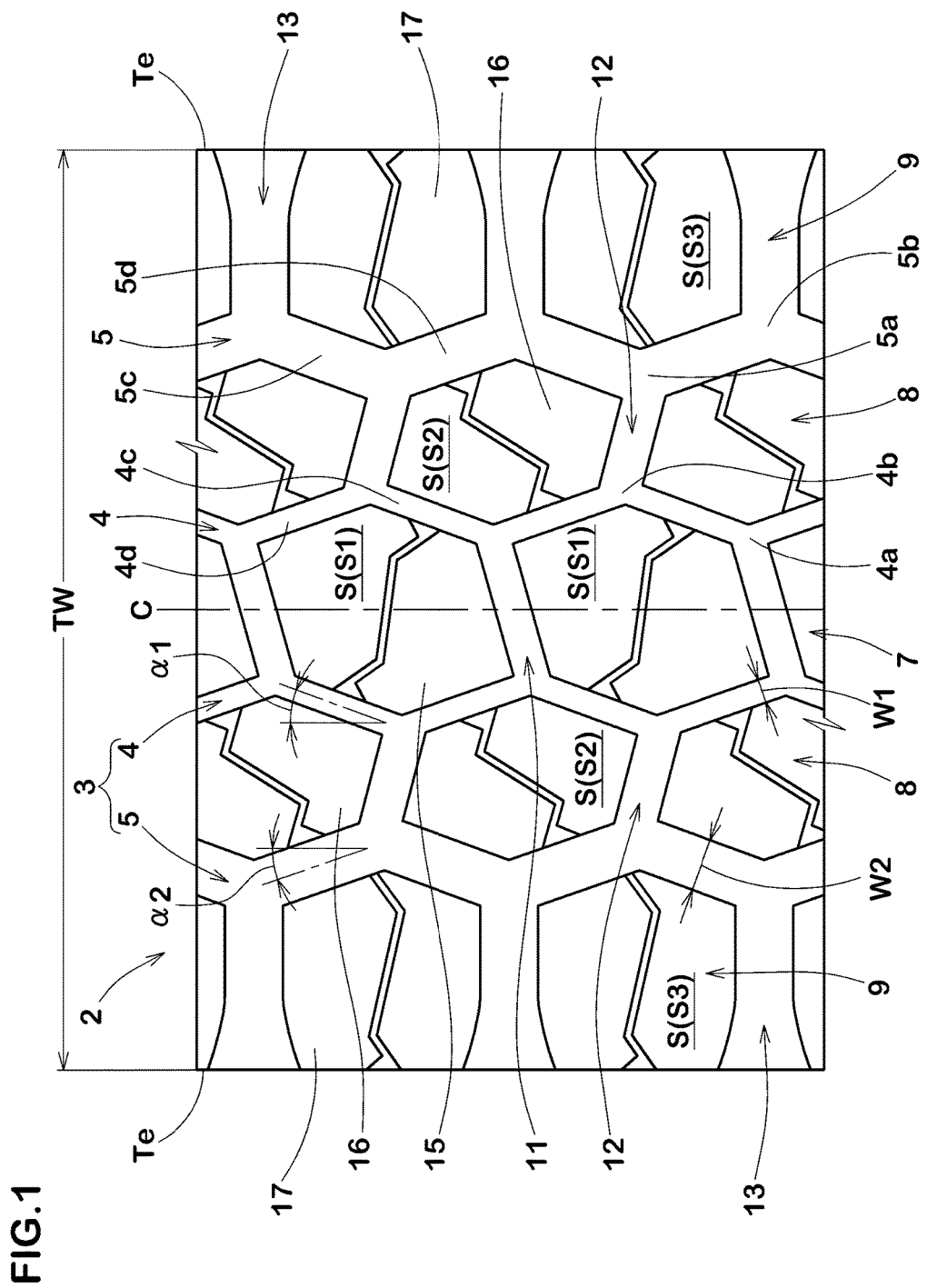
FIG. 1 is a developed partial view of the tread portion of a heavy duty pneumatic tire as an embodiment of the present invention.

In the embodiment shown in FIG. 1, the main grooves 3 include two crown main grooves 4 disposed one on each side of the tire equator C, and two shoulder main grooves 5 disposed axially outside the respective crown main grooves 4 as the axially outermost main grooves.

By the main grooves 3, the tread portion 2 is axially divided into a crown region 7 between the crown main grooves 4, two middle regions 8 between the crown main grooves 4 and the shoulder main grooves 5, and two shoulder regions 9 between the shoulder main grooves 5 and the tread edges Te.

The crown region 7 is circumferentially divided by crown axial grooves 11 into crown blocks 15.

Each middle region 8 is circumferentially divided by middle axial grooves 12 into middle blocks 16.

Each shoulder region 9 is circumferentially divided by shoulder axial grooves 13 into shoulder blocks 17.

Each crown main groove 4 is a zigzag groove composed of first oblique segments 4c and second oblique segments 4d which are arranged alternately in the tire circumferential direction and which are inclined with respect to the tire circumferential direction to mutually opposing directions, right or left, alternately.

Accordingly, the crown main groove 4 has inwardly projecting parts 4a projecting toward the axially inside, and outwardly projecting parts 4b projecting toward the axially outside, which projecting parts are alternate in the tire circumferential direction.

Preferably, the angle $\alpha 1$ of the first oblique segments 4c and the angle $\alpha 1$ of the second oblique segments 4d are set in a range of from 15 to 25 degrees with respect to the tire circumferential direction in order to secure desirable block rigidity of the crown blocks 15 and good drainage in the crown region 7.

Preferably, the groove width W1 of the crown main grooves 4 is set in a range of not less than 1.0%, more preferably not less than 1.5%, but not more than 5.0%, more preferably not more than 4.0% of the tread width TW in order to secure good drainage in the crown region 7.

Each shoulder main groove 5 is a zigzag groove composed of first oblique segments 5c and second oblique segments 5d which are arranged alternately in the tire circumferential direction and which are inclined with respect to the tire circumferential direction to mutually opposing directions, right or left, alternately.

Accordingly, the shoulder main groove 5 has inwardly projecting parts 5a projecting toward the axially inside, and outwardly projecting parts 5b projecting toward the axially outside, which projecting parts are alternate in the tire circumferential direction.

Preferably, the angle $\alpha 2$ of the first oblique segments 5c and the angle $\alpha 2$ of the second oblique segments 5d are set in a range of not less than 15 degrees but not more than 25 degrees with respect to the tire circumferential direction in order to secure desirable block rigidity of the middle blocks 16 and good drainage in the middle regions 8 and shoulder regions 9.

Preferably, the groove width W2 of the shoulder main grooves 5 is set in a range of not less than 1.0%, more preferably not less than 1.5%, but not more than 5.0%, more preferably not more than 4.0% of the tread width TW in order to secure good drainage in the middle regions 8 and shoulder regions 9.

The groove width W1 of the crown main grooves 4 is less than the groove width W2 of the shoulder main grooves 5. Accordingly, the middle blocks 16 approach the crown blocks 15, and thereby, the load acting on the tread crown region is distributed to the crown blocks 15 as well as the middle blocks 16 in a balanced manner to avoid concentration on the crown blocks 15. Therefore, the early wear of the crown blocks 15 (center wear) can be prevented.

In order to effectively derive the above-mentioned function, the ratio W2/W1 of the groove width W2 of the shoulder main grooves 5 to the groove width W1 of the crown main grooves 4 is preferably set in a range of from 1.1 to 3.0.

Preferably, the distance W9 of the amplitude center line G of the zigzag of the widthwise center line of the shoulder main groove 5 from the tire equator C is set in a range of from 50% to 75% of a half tread width TW/2 in order to further improve the resistance to center wear while securing the good drainage.

If the distance W9 is less than 50% of a half tread width TW/2, there is a possibility that the area occupied by the crown blocks 15 and the middle blocks 16 becomes insufficient, and as a result, the ground pressure of these blocks increases, and the resistance to center wear is decreased.

If the distance W9 is more than 75% of a half tread width TW/2, there is a possibility that the area occupied by the crown blocks 15 and the middle blocks 16 becomes excessively large, and as a result, axially outward drainage becomes difficult.

The crown axial grooves 11 in the crown region 7 extend straight from the inwardly projecting parts 4a of one of the crown main grooves 4 to the inwardly projecting parts 4a of the other crown main groove 4.

Thereby, the crown region 7 is formed as a row of the crown blocks 15 each having a hexagonal shape in its top view.

Such crown block 15 has higher rigidity in its central portion, and the internal angles of the tread S of the crown block 15 tend to become large, therefore, the block 15 has good rigidity balance.

As a result, the amount of deformation of the crown block 15 during contacting with the ground is reduced to improve the rolling resistance of the tire.

Further, slippage between the crown block 15 and the road surface becomes even over the entire tread area, and uneven wear of the crown block 15 such as heel-and-toe wear can be reduced.

Further, in each crown block 15, it is preferable that the edge length ratio between the lengths of any two of the six sides of its hexagonal shape or the six edges of the tread S falls within a range of from 0.8 to 1.3 in order that the hexagonal shape becomes closer to a regular hexagon and the rigidity balance of the block is improved.

Therefore, even if the tire in this embodiment is used as a drive axle tire, the occurrence of uneven wear can be prevented because the slippage between the tread S of the crown block 15 and the road surface becomes evened.

In this embodiment, the above-mentioned six sides (six edges of the tread S) are such that each side and its opposite side are parallel with each other and have the same length.

Figure 2:
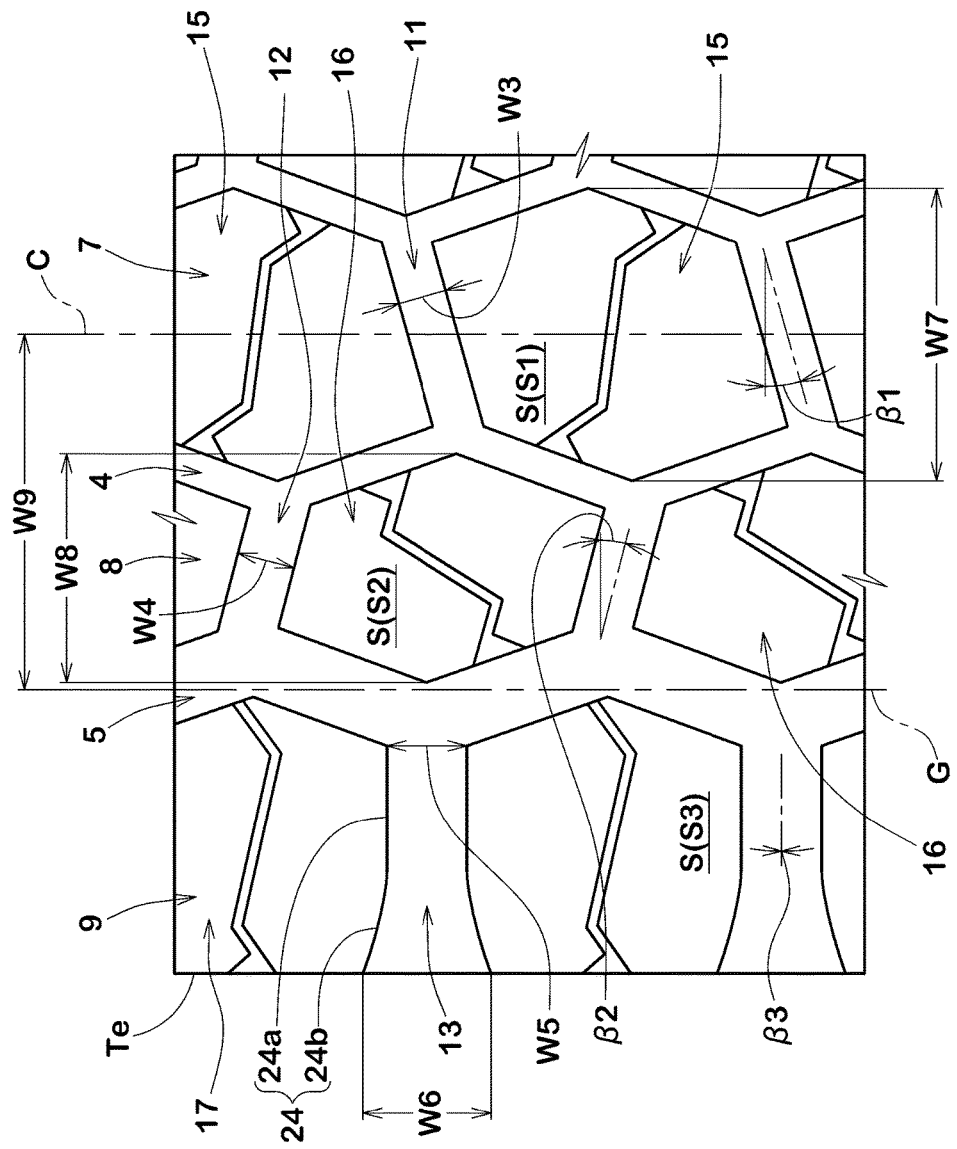
FIG. 2 is a closeup of a left-hand part of the tread portion shown in FIG. 1.

The crown axial grooves 11 are inclined with respect to the tire axial direction at an inclination angle $\beta 1$ as shown in FIG. 2. The inclination angle $\beta 1$ is preferably not more than 40 degrees.

If the inclination angle $\beta 1$ is more than 40 degrees, there is a possibility that circumferential end portions of the crown block 15 are decreased in the rigidity and liable to cause uneven wear. If the inclination angle $\beta 1$ is excessively small, there is a possibility that impact noise generated from the crown block 15 when contacting with the ground increases and the drainage is deteriorated.

From this standpoint, the inclination angle $\beta 1$ of the crown axial groove 11 is preferably set in a range of from 10 to 20 degrees.

Preferably, the groove width W3 of the crown axial grooves 11 is set in a range of from 5.0 to 10.0 mm in order to secure good drainage in the crown region 7.

Preferably, the maximum axial width W7 of the crown block 15 is in a range of from 20% to 35% of the tread width TW.

Preferably, the hexagonal shape of each crown block 15 is a circumferentially long hexagonal shape rather than a regular hexagon in order to increase the circumferential rigidity of the crown block 15.

Figure 3:
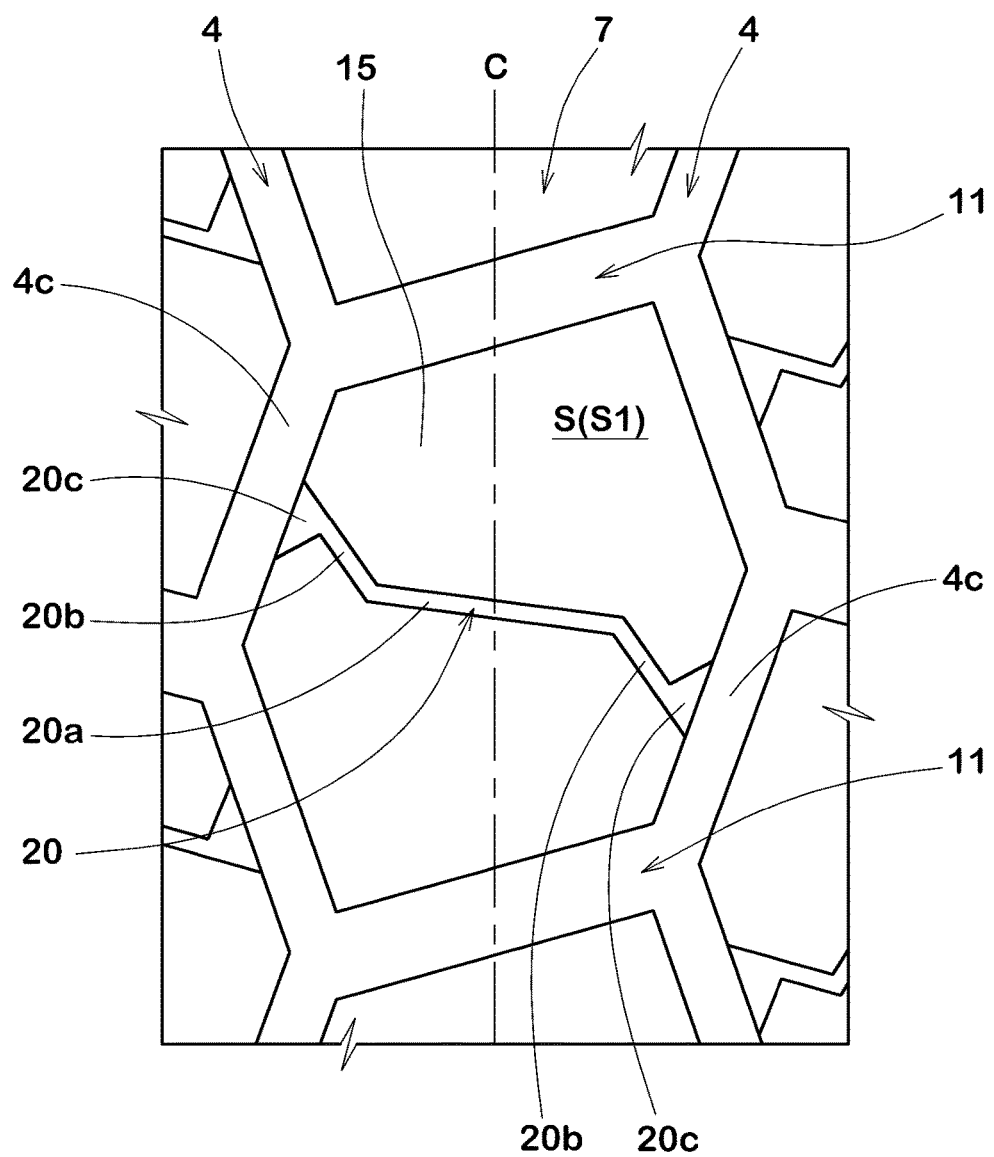
FIG. 3 is a closeup of a crown block shown in FIG. 1.

In this embodiment, each crown block 15 is provided with a crown shallow groove 20 extending across the width of the tread S as shown in FIG. 3.

The groove width and groove depth of the crown shallow groove 20 are smaller than (for example, not more than 50%, preferably not more than 30% of) the groove width and groove depth of the crown axial grooves 11, respectively.

Such crown shallow groove 20 suppresses a decrease in the rigidity of the crown block 15, and provides a space allowing the block to deform when contacting with the ground, further improves the uneven wear resistance of the crown block 15. Further, the crown shallow groove 20 helps to improve the drainage in the crown region 7.

The crown shallow groove 20 extends zigzag to partition the tread S in the tire circumferential direction, for example, into two halves.

Preferably, the crown shallow groove 20 includes a central portion 20a inclined with respect to the tire axial direction to the opposite direction to the crown axial groove 11, and a pair of end portions 20b bent from the central portion 20a.

The crown shallow grooves 20 extend from the first oblique segments 4c of one of the crown main grooves 4 to the first oblique segments 4c of the other crown main groove 4.

The central portion 20a is longer than any of other portions of the crown shallow groove 20.

When the tread S of the crown block 15 is subjected to a large force in the tire circumferential direction or in the tire axial direction, the block parts on both sides of the crown shallow groove 20 contact with each other to support each other, and thereby it is possible to increase the apparent rigidity of the crown block 15.

Preferably, each end portion 20b includes a flared part 20c whose groove width increases towards its open end.

The flared part 20c helps to further increase the drainage in the crown region 7.

other than the flared part 20c, the crown shallow groove 20 has a constant groove width.

As shown in FIG. 1, on each side of the tire equator, the middle axial grooves 12 in the middle region 8 extend straight from the outwardly projecting parts 4b of the crown main groove 4 to the inwardly projecting parts 5a of the shoulder main groove 5.

Thereby, the middle region 8 is formed as a row of middle blocks 16 having a hexagonal shape in its top view.

The middle axial grooves 12 are inclined with respect to the tire axial direction to the opposite direction to the crown axial grooves 11.

Thereby, edge effect is exerted in a balanced manner.

The middle block 16 whose tread S is formed in a hexagonal shape is decreased in the heel-and-toe wear and exerts high resistance to uneven wear.

Further, in each middle block 16, it is preferable that the edge length ratio between the lengths of any two of the six sides of the hexagonal shape or the six edges of the tread S falls within a range of from 0.8 to 1.3.

Such middle block 16 is further improved in the rigidity balance and has good uneven wear resistance.

In this embodiment, the above-mentioned six sides (six edges) are such that each side and its opposite side are parallel with each other and have the same length.

As shown in FIG. 2, the maximum axial width W8 of the middle blocks 16 is smaller than the maximum axial width W7 of the crown blocks 15.
The middle block 16 whose maximum width is relatively small as explained above helps to reduce the load distributed to the crown block 15 while securing drainage toward the axially outside from a tire equator C side.
Preferably, the shape of the tread S of each middle block 16 is a circumferentially long hexagonal shape rather than a regular hexagon in order to increase the circumferential rigidity of the middle block 16.

The middle axial grooves 12 have a groove width W4 more than the groove width W3 of the crown axial grooves 11.
Preferably, the groove width W4 of the middle axial grooves 12 is set in a range of from 5.0 to 10.0 mm.
Thereby, the drainage is improved in the middle region. In the crown region 7, on the other hand, owing to the relatively narrow crown axial grooves 11, high pattern rigidity can be obtained, and the uneven wear resistance of the crown block 15 is improved.

In order to effectively derive the above-mentioned functions, the ratio W4/W3 of the groove width W4 of the middle axial grooves 12 to the groove width W3 of the crown axial grooves 11 is preferably set in a range of not less than 1.1, more preferably not less than 1.5, but not more than 3.0, more preferably not more than 2.5.

The middle blocks 16 are liable to be subjected to lateral force larger than the crown blocks during cornering.
Accordingly, it is preferable that the middle axial grooves 12 are inclined with respect to the tire axial direction at an inclination angle β2 as shown in FIG. 2. The inclination angle β2 is set in a range of from 10 to 20 degrees.
Especially preferably, the inclination angle β2 is set to be less than the inclination angle β1 of the crown axial grooves 11.
Accordingly, the sides (edges) of the tread S of the middle block 16 abutting on the middle axial grooves 12 become closer to the tire axial direction. Thereby, it is possible to further improve uneven wear resistance of the circumferential end portions of the middle block 16.

Figure 4:
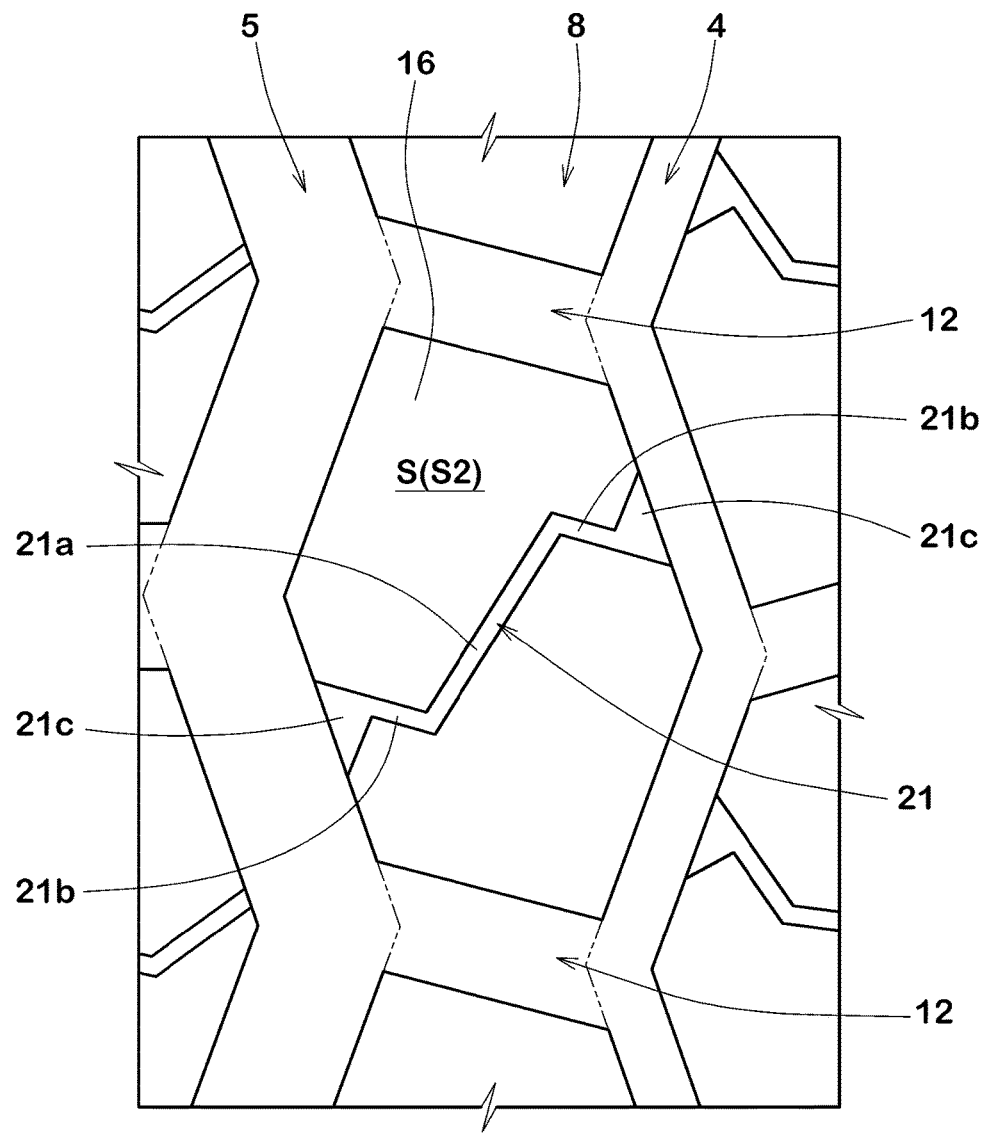
FIG. 4 is a closeup of a middle block shown in FIG. 1.

In this embodiment, each middle block 16 is provided with a middle shallow groove 21 extending across the width of the tread S of the middle block 16 as shown in FIG. 4.

The middle shallow groove 21 extends from the crown main groove 4 to the shoulder main groove 5.

The groove width and groove depth of the middle shallow groove 21 are smaller than (for example, not more than 50%, preferably not more than 30% of) the groove width and groove depth of the middle axial grooves 12, respectively.

Such middle shallow groove 21 suppresses a decrease in the rigidity of the middle block 16, and provides a space allowing the block to deform when contacting with the ground, further improves the uneven wear resistance of the middle block 16. Furthermore, the middle shallow grooves 21 help to improve drainage in the middle region 8.

In this embodiment, the middle shallow groove 21 extends zigzag to partition the tread S in the tire circumferential direction, for example, into two halves.

Preferably, the middle shallow groove 21 includes a central portion 21a inclined with respect to the tire axial direction to the opposite direction to the middle axial groove 12, and a pair of end portions 21b bent from the central portion 21a.

The central portion 21a is longer than any of other portions of the middle shallow groove 21.

When the tread S of the middle block 16 is subjected to a large force in the tire circumferential direction or in the tire axial direction, the block parts on both sides of the middle shallow groove 21 contact with each other to support each other, and thereby it is possible to increase the apparent rigidity of the middle block 16.

Preferably, each end portion 21b includes a flared part 21c whose groove width increases towards the open end of the groove.

Such flared parts 21c help to further increase the drainage in the middle region 8.
Other than the flared part 21c, the middle shallow groove 21 has a constant groove width.

Figure 5:
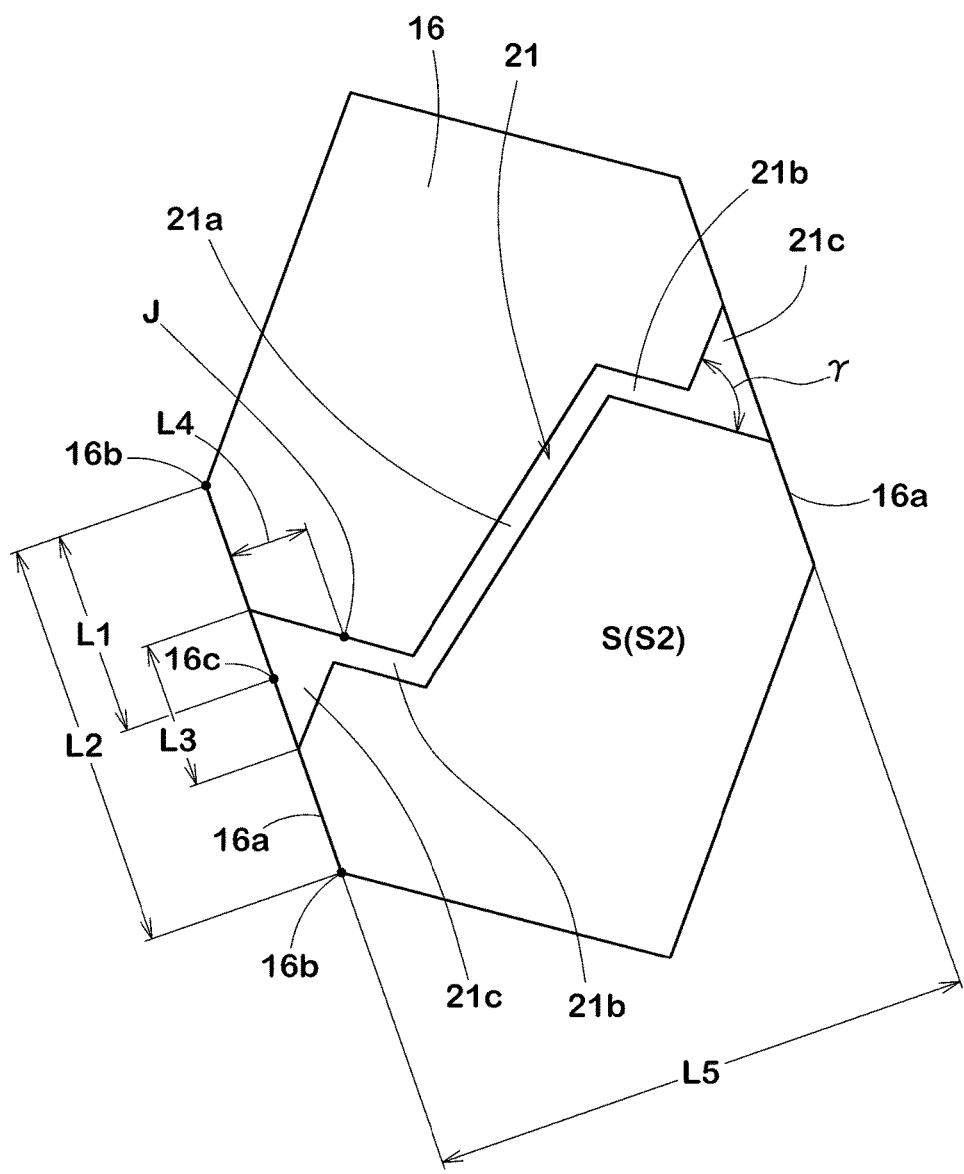
FIG. 5 is an enlarged top view of the middle block.

As shown in FIG. 5, the angle γ between the groove edges of the flared part 21c of the middle shallow groove 21 is preferably set in a range of from 30 to 110 degrees. Thereby, it is possible to improve the drainage and the rigidity of the middle block 16 in a balanced manner.

It is preferable that the flared part 21c of the middle shallow groove 21 is disposed in the middle position of the length L2 of the relevant side or edge 16a of the tread S of the middle block 16 at which the flared part 21c is opened.
It is especially preferable that the distance L1 of the center 16c of the maximum groove width L3 at the open end from each end 16b of the side 16a is in a range of from 0.3 to 0.7 times the length L2 of the side 16a.
Such flared part 21c helps to control the rigidity of the middle block 16 in a balanced manner.

The maximum groove width L3 at the open end of the flared part 21c is preferably set in a range of from 0.2 to 0.5 times the length L2 of the side 16a at which the flared part 21c is opened.
If the maximum groove width L3 at the open end of the flared part 21c is less than 0.2 times the length L2, then there is a possibility that drainage can not be sufficiently improved.
If the maximum groove width L3 at the open end is more than 0.5 times the length L2, then there is a possibility that the rigidity balance of the middle block 16 is deteriorated.

In order to more effectively derive the above-mentioned advantageous effects, the shortest distance L4 from the inside end J of the flared part 21c to the side 16a at which the flared part 21c is opened, is preferably set in a range of from 0.05 to 0.2 times the width L5 of the middle block 16, wherein the shortest distance L4 and the width L5 are measured in a direction perpendicular to the side 16a.

In this embodiment, as shown in FIG. 1 and FIG. 2, the shoulder axial grooves 13 in each shoulder region 9 extend axially outwardly from the outwardly projecting parts 5b of the shoulder main groove 5 to the tread edge Te, and the shoulder region 9 is formed as a row of shoulder blocks 17.

Figure 6:
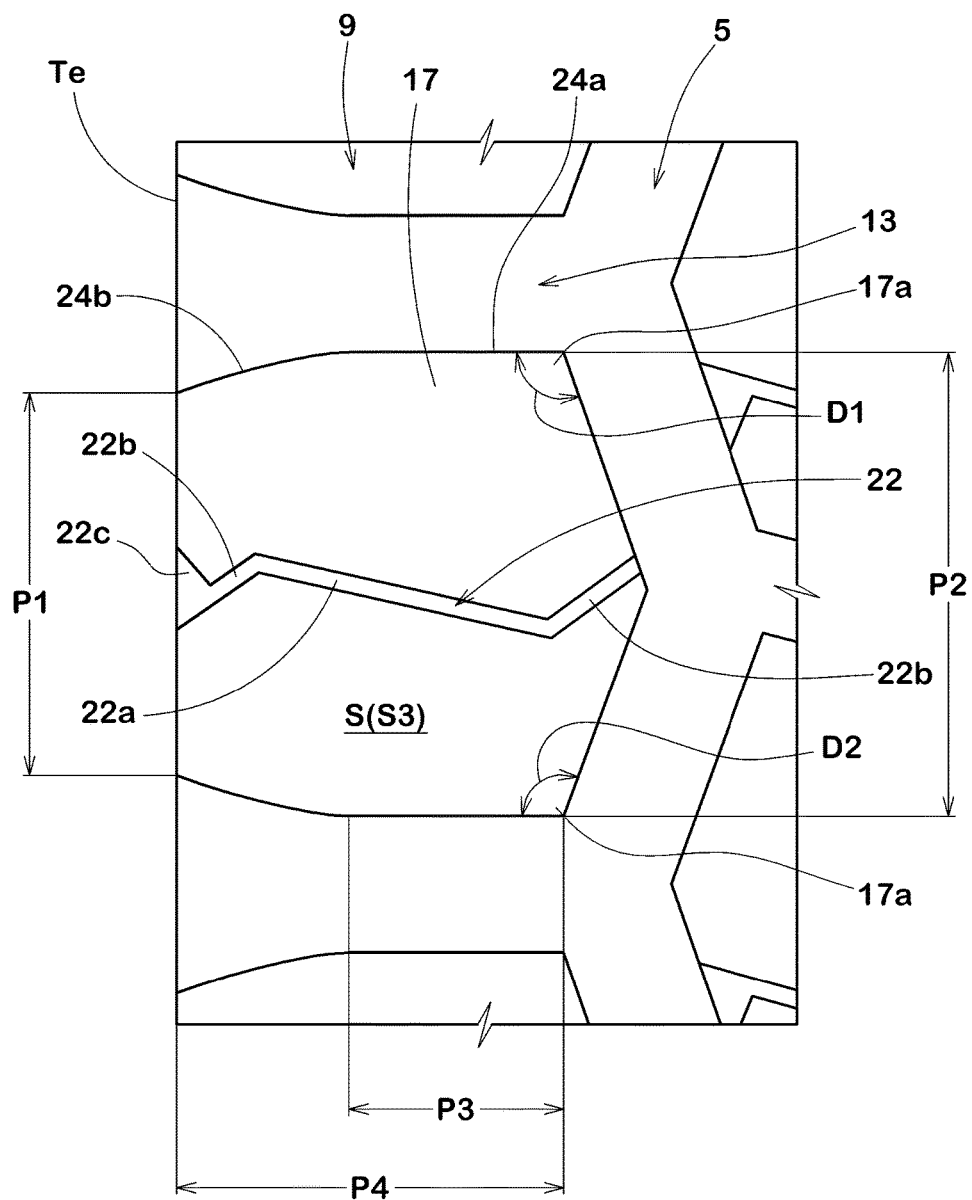
FIG. 6 is a closeup of a shoulder block shown in FIG. 1.

The angle β3 of the widthwise center line of each shoulder axial groove 13 with respect to the tire axial direction is preferably set in a range of from 0 to 20 degrees.
Preferably, the angle β3 is set to be less than the inclination angle β2 of the middle axial grooves 12.
Thereby, the rigidity of the circumferential end portions of the shoulder block 17 is increased, and thereby uneven wear such as heel-and-toe wear can be suppressed.
As the angle β3 of the shoulder axial grooves 13 is relatively small, internal angles D1 and D2 of the corners 17a of the tread s of the shoulder block 17 positioned at both circumferential ends as shown in FIG. 6 can be increased, therefore, uneven wear starting from the corners 17a can be suppressed.

In order to more effectively derive this advantageous effect, it is preferred that the internal angles D1 and D2 are not less than 90 degrees.

The shoulder axial groove 13 has a minimum groove width W5 at the axially inner end and a maximum groove width W6 at the axially outer end. Such shoulder axial grooves 13 help to improve drainage in the shoulder region 9.

In order to further improve the drainage in the middle regions 8 and shoulder regions 9, the minimum groove width W5 is preferably set to be more than the groove width W4 of the middle axial grooves 12.

In each shoulder axial groove 13, it is preferable that at least one of (in this embodiment, each of) the groove edges 24 thereof is composed of a straight portion 24a extending straight from the shoulder main groove 5 and a curved portion 24b extending from the straight portion 24a to the tread edge Te. The curved portion 24b is curved in an arc shape so that the groove width of the shoulder axial groove 13 is increased toward the axially outside.

Such shoulder axial grooves 13 helps to suppress uneven wear of the shoulder blocks 17 while increasing the drainage in the shoulder regions 9.

In this embodiment, each shoulder block 17 is provided with a shoulder shallow groove 22 extending across the width of the tread S as shown in FIG. 6.

The shoulder shallow groove 22 includes a pair of end portions 22b, and a central portion 22a therebetween bent from each end portion 22b so as to extend zigzag in the tire axial direction. Only the axially outer end portion 22b is provided with a flared part 22c in which the groove width gradually increases toward the axially outside.

The groove width and groove depth of the shoulder shallow groove 22 are not more than 50%, preferably not more than 30% of the groove width and groove depth of the shoulder axial grooves 13, respectively.

Such shoulder shallow groove 22 allows the shoulder block 17 to cause moderate deformation when contacting with the ground to reduces the wear energy, and helps to further improve the drainage in the shoulder region 9.

In order to effectively prevent the center wear, the area S3 of the tread S of the shoulder block 17 is preferably set to be less than the area S1 of the tread S of the crown block 15.

In order to more effectively derive the above-mentioned advantageous effects, it is preferable that the area S3 of the tread S of one of the shoulder blocks 17, the area S1 of the tread S of one of the crown blocks 15, and the area S2 of the tread S of one of the middle blocks 16 satisfy $$S3<S1/2+S2.$$

Thereby, the load exerted on the tread crown region is supported by the crown blocks 15 and the middle blocks 16 in a balanced manner, and the blocks 15 and 16 can be reduced in the ground pressure.

Similarly, it is preferred that the land ratio of each shoulder region 9 is less than the land ratio of the crown region 7.

Here, the land ratio is a ratio of the total ground contacting area of a region to the overall area of the concerned region.

The inclination angle $\beta 1$ of the crown axial grooves 11, the inclination angle $\beta 2$ of the middle axial grooves 12 and the inclination angle $\beta 3$ of the shoulder axial grooves 13 are set to satisfy the following condition:

$$\beta 1 > \beta 2 > \beta 3$$

in order to increase the drainage in the tread crown region while suppressing uneven wear in the tread shoulder regions.

In order to assure such advantageous effect, it is preferred that the difference between the inclination angle $\beta 2$ of the middle axial grooves 12 and the inclination angle $\beta 3$ of the shoulder axial grooves 13 is more than the difference between the inclination angle $\beta 1$ of the crown axial grooves 11 and the inclination angle $\beta 2$ of the middle axial grooves 12.

In order to secure the area S3 of the shoulder block 17 and avoid a decrease in the rigidity, it is preferable that the ratio P1/P2 of the minimum P1 to the maximum P2 of the circumferential length of the shoulder block 17 is not less than 0.7.

In order to ensure the above-mentioned functions and improve the drainage in the shoulder regions 9, it is preferable that the axial distance P4 from the tread edge Te to each corner 17a of the tread 5 of the shoulder block 17 is not less than 15% of the tread width TW.

In this embodiment, the axially inner edge of the tread S of the shoulder block 17 abutting on the shoulder main groove 5 is made up of two straight segments.

In order to improve the rigidity balance of the shoulder block 17, it is preferable that the ratios of the lengths of the two straight segments fall within a range of from 0.8 to 1.25.

It is preferable, for the similar reasons, that the length P3 of the straight portion 24a of the shoulder axial groove 13 is in a range of from 0.3 to 0.7 times the above-mentioned axial distance P4.

Comparison Test 1

Based on the tread pattern shown in FIG. 1, test tires of size 11R22.5 (rim size: 22.5×8.25) having specifications listed in Table 1-1 were experimentally manufactured and tested as follows.

<Wear Test>

Embodiment 1-1 tires (as reference tire) were mounted on the rear wheels on one side of a 2-D wheel-type ten-ton truck and other test tires were mounted on the rear wheels on the other side, and the truck was run until the wear indicator of the reference tire or the test tire reached 50% wear. (Tire inflation pressure: 720 kPa)

Then, with respect to the test tire, the amount of wear of the crown blocks was obtained by measuring the block height at three circumferentially different measuring positions and subtracting the averaged measurements from the original block height. Similarly, the amount of wear of the shoulder blocks and the amount of wear of the middle blocks were obtained.

The ratio of the amount of wear of the crown blocks to the amount of wear of the shoulder blocks is indicated in the "center wear" section of Table 1-1, wherein the ratio closer to 1 is better.

Further, it was checked whether there was early wear in the middle blocks or not by comparing the amount of wear of the middle blocks with those of the crown blocks and shoulder blocks. The results are indicated in the "early wear of middle blocks" section of Table 1-1, wherein "γ" means that early wear was observed, and "N" means that early wear was not observed.

<Wet Performance Test>

On an asphalt road surface covered with 5 mm depth water, the time required for the above-mentioned truck provided on all of the wheels with the same test tires to run for 10 meters was measured from the moment when the clutch was connected.

Reciprocals of the measurements are indicated in Table 1-1 by an index based on Embodiment 1-1 being 100, wherein the larger the value, the better the wet performance.

listed in Table 2-1 were experimentally manufactured and tested as follows.

<Uneven Wear Resistance Test>

Embodiment 2-1 tires (as reference tire) were mounted on the rear wheels on one side of a 2-D wheel-type ten-ton truck and other test tires were mounted on the rear wheels on the other side, and the truck was run until the wear indicator of the reference tire or the test tire reached 50% wear. (Tire inflation pressure: 720 kPa)

Then, with respect to the test tire, the crown blocks were measured for the block height at three circumferentially different measuring positions, and the difference between the maximum value and minimum value of the measurements was obtained.

Similarly, the difference in the shoulder blocks was obtained. The larger one of the two differences is indicated as reciprocal in Table 2-1 by an index based on Embodiment 2-1 being 100, wherein the larger the value, the better of the uneven wear resistance.

<Wet Performance Test>

On an asphalt road surface covered with 5 mm depth water, the time required for the above-mentioned truck provided on all of the wheels with the same test tires to run

TABLE 1-1

| Tire | Ref.1-1 | Ex.1-1 | Ex.1-2 | Ex.1-3 | Ref.1-2 | Ref.1-3 | Ex.1-4 | Ex.1-5 | Ref.1-4 |
|---|---|---|---|---|---|---|---|---|---|
| crown main groove width W1/tread width TW | 13.3 | 6.5 | 9.8 | 4.5 | 3.3 | 6.5 | 6.5 | 6.5 | 6.5 |
| shoulder main groove width W2/width W1 | 0.5 | 2.1 | 1.1 | 3.0 | 5.0 | 2.1 | 2.1 | 2.1 | 2.1 |
| crown axial groove width W3/tread width TW | 12.0 | 12.0 | 12.0 | 12.0 | 12.0 | 3.6 | 10.5 | 28.6 | 31.5 |
| middle axial groove width W4/width W3 | 1.3 | 1.3 | 1.3 | 1.3 | 1.3 | 0.4 | 1.1 | 3.0 | 3.5 |
| center wear | 3.5 | 1.0 | 1.9 | 1.4 | 2.5 | 1.0 | 1.0 | 1.0 | 1.0 |
| early wear of middle blocks | N | N | N | N | N | N | N | N | Y |
| wet performance | 100 | 100 | 100 | 100 | 100 | 80 | 95 | 100 | 100 |

As shown in Table 1-1, Embodiment tires can be improved in the wear resistance without sacrificing the wet performance.

Comparison Test 2

Based on the tread pattern shown in FIG. 1, test tires of size 11R22.5 (rim size: 22.5×8.25) having specifications for 10 meters was measured from the moment when the clutch was connected. Reciprocals of the measurements are indicated in Table 2-1 by an index based on Embodiment 2-1 being 100, wherein the larger the value, the better the wet performance.

TABLE 2-1

| Tire | Ref.2-1 | Ex.2-1 | Ex.2-2 | Ex.2-3 | Ex.2-4 | Ex.2-5 | Ex.2-6 |
|---|---|---|---|---|---|---|---|
| shoulder main groove width W2/crown main groove width W1 | 2.0 | 2.0 | 1.0 | 1.5 | 2.5 | 3.0 | 2.0 |
| distance W9/a half tread width TW/2 (%) | 60 | 60 | 60 | 60 | 60 | 60 | 50 |
| (S1/2 + S2)/S3 | 2.0 | 2.0 | 2.0 | 2.0 | 2.0 | 2.0 | 2.0 |
| angle β1 (deg.) | 15 | 20 | 20 | 20 | 20 | 20 | 20 |
| angle β3 (deg.) | 20 | 5 | 5 | 5 | 5 | 5 | 5 |
| uneven wear resistance | 85 | 100 | 85 | 95 | 95 | 85 | 85 |
| wet performance | 85 | 100 | 100 | 100 | 95 | 90 | 100 |
| Tire | Ex.2-7 | Ex.2-8 | Ex.2-9 | Ex.2-10 | Ex.2-11 | Ex.2-12 | Ex.2-13 |
| shoulder main groove width W2/crown main groove width W1 | 2.0 | 2.0 | 2.0 | 2.0 | 2.0 | 2.0 | 2.0 |

TABLE 2-1-continued

| | | | | | | | |
|---|---|---|---|---|---|---|---|
| distance W9/a half tread width TW/2 (%) | 55 | 68 | 75 | 60 | 60 | 60 | 60 |
| (S1/2 + S2)/S3 | 2.0 | 2.0 | 2.0 | 1.0 | 1.5 | 2.5 | 3.0 |
| angle β1 (deg.) | 20 | 20 | 20 | 20 | 20 | 20 | 20 |
| angle β3 (deg.) | 5 | 5 | 5 | 5 | 5 | 5 | 5 |
| uneven wear resistance | 95 | 95 | 85 | 85 | 95 | 95 | 85 |
| wet performance | 100 | 95 | 90 | 100 | 100 | 95 | 90 |

As shown in Table 2-1, Embodiment tires can be improved in the drainage in the tread crown region and uneven wear in the tread shoulder regions.

Comparison Test 3

Based on the tread pattern shown in FIG. 1, test tires of size 11R22.5 (rim size: 22.5×8.25) having specifications listed in Table 3-1 were experimentally manufactured and tested as follows.

<Wear Test>

Embodiment 3-1 tires (as reference tire) were mounted on the rear wheels on one side of a 2-D wheel-type ten-ton truck and other test tires were mounted on the rear wheels on the other side, and the truck was run until the wear indicator of the reference tire or the test tire reached 50% wear. (Tire inflation pressure: 720 kPa)

Then, with respect to the test tire, the amount of wear of the crown blocks was obtained by measuring the block height at three circumferentially different measuring positions and subtracting the averaged measurements from the original block height.

Similarly, the amount of wear of the shoulder blocks and the amount of wear of the middle blocks were obtained.

The ratio of the amount of wear of the crown blocks to the amount of wear of the shoulder blocks is indicated in the "center wear" section of Table 3-1, wherein the ratio closer to 1 is better.

Further, it was checked whether there was early wear in the shoulder blocks or not by comparing the amount of wear of the shoulder blocks with those of the crown blocks and middle blocks. The results are indicated in the "early wear of shoulder blocks" section of Table 3-1, wherein "γ" means that early wear was observed, and "N" means that early wear was not observed.

<Wet Performance Test>

On an asphalt road surface covered with 5 mm depth water, the time required for the above-mentioned truck provided on all of the wheels with the same test tires to run for 10 meters was measured from the moment when the clutch was connected. Reciprocals of the measurements are indicated in Table 3-1 by an index based on Embodiment 3-1 being 100, wherein the larger the value, the better the wet performance.

TABLE 3-1

| Tire | Ref.3-1 | Ex.3-1 | Ex.3-2 | Ex.3-3 | Ex.3-4 | Ex.3-5 | Ex.3-6 | Ex.3-7 |
|---|---|---|---|---|---|---|---|---|
| area S1/area S3 | 1.23 | 1.23 | 0.56 | 1.23 | 1.23 | 1.23 | 1.23 | 1.23 |
| crown land portion's land ratio/shoulder land portions' land ratio | 1.16 | 1.16 | 1.16 | 0.95 | 1.16 | 1.16 | 1.16 | 1.16 |
| crown main groove width W1/shoulder main groove width W2 | 0.48 | 0.48 | 0.48 | 0.48 | 2.08 | 0.48 | 0.48 | 0.48 |
| crown block's edge length ratio (maximum value) | 1.33 | 1.20 | 1.20 | 1.20 | 1.20 | 1.20 | 1.20 | 1.20 |
| middle block's edge length ratio (maximum value) | 1.25 | 1.25 | 1.25 | 1.25 | 1.25 | 1.50 | 1.25 | 1.25 |
| distance W9/a half tread width TW/2 (%) | 65 | 65 | 65 | 65 | 65 | 65 | 45 | 80 |
| center wear | 3.0 | 1.0 | 2.0 | 2.0 | 2.0 | 2.0 | 3.0 | 2.0 |
| early wear of shoulder blocks | N | N | N | N | N | N | N | N |
| wet performance | 100 | 100 | 100 | 100 | 100 | 100 | 100 | 80 |

As shown in Table 3-1, Embodiment tires can be improved in the uneven wear resistance.

Comparison Test 4

Based on the tread pattern shown in FIG. 1, test tires of size 11R22.5 (rim size: 22.5×8.25) having specifications listed in Table 4-1 were experimentally manufactured. In the comparative example tire Ref. 4-1, however, each shoulder axial groove had groove edges extending straight from the shoulder main groove to the tread edge. The tires were tested as follows.

<Wear Test>

Embodiment 4-1 tires (as reference tire) were mounted on the rear wheels on one side of a 2-D wheel-type ten-ton truck and other test tires were mounted on the rear wheels on the other side, and the truck was run until the wear indicator of the reference tire or the test tire reached 50% wear. (Tire inflation pressure: 720 kPa)

Then, with respect to the test tire, the amount of wear of the crown blocks was obtained by measuring the block height at three circumferentially different measuring positions and subtracting the averaged measurements from the original block height. Similarly, the amount of wear of the shoulder blocks and the amount of wear of the middle blocks were obtained.

The ratio of the amount of wear of the crown blocks to the amount of wear of the shoulder blocks is indicated in the "center wear" section of Table 4-1, wherein the ratio closer to 1 is better.

Further, it was checked whether there was early wear or not by comparing the amount of wear of the shoulder blocks with those of the crown blocks and middle blocks.

The results are indicated in the "early wear" section of Table 4-1, wherein "γ" means that early wear was observed, and "N" means that early wear was not observed.

<Wet Performance Test>

On an asphalt road surface covered with 5 mm depth water, the time required for the above-mentioned truck provided on all of the wheels with the same test tires to run for 10 meters was measured from the moment when the clutch was connected. Reciprocals of the measurements are indicated in Table 4-1 by an index based on Embodiment 4-1 being 100, wherein the larger the value, the better the wet performance.

TABLE 4-1

| Tire | Ref.4-1 | Ex.4-1 | Ex.4-2 | Ex.4-3 | Ex.4-4 | Ex.4-5 | Ex.4-6 | Ex.4-7 |
|---|---|---|---|---|---|---|---|---|
| shoulder main groove width W2/crown main groove width W1 | 2.1 | 2.1 | 0.5 | 1.0 | 3.0 | 5.0 | 2.1 | 2.1 |
| middle axial groove width W4/crown main groove width W1 | 1.7 | 1.7 | 0.8 | 1.0 | 1.7 | 2.4 | 1.7 | 1.7 |
| shoulder main groove width W2/middle axial groove width W4 | 1.2 | 1.2 | 0.7 | 1.0 | 1.8 | 2.1 | 1.2 | 1.2 |
| shoulder axial groove minimum width W5/shoulder main groove width W2 | 1.1 | 1.1 | 0.6 | 1.0 | 1.1 | 1.2 | 1.1 | 1.1 |
| distance W9/a half tread width TW/2 (%) | 60 | 60 | 60 | 60 | 60 | 60 | 50 | 75 |
| (S1/2 + S2)/S3 shoulder block | 1.5 | 1.5 | 1.5 | 1.5 | 1.5 | 1.5 | 1.5 | 1.5 |
| minimum P1/maximum P2 | 0.8 | 0.8 | 0.8 | 0.8 | 0.8 | 0.8 | 0.8 | 0.8 |
| straight edge segment length ratio | 1.0 | 1.0 | 1.0 | 1.0 | 1.0 | 1.0 | 1.0 | 1.0 |
| length P3/distance P4 | — | 0.5 | 0.5 | 0.5 | 0.5 | 0.5 | 0.5 | 0.5 |
| center wear | 100 | 100 | 75 | 90 | 90 | 85 | 90 | 90 |
| early wear | N | N | N | N | N | N | N | N |
| wet performance | 65 | 100 | 70 | 90 | 100 | 130 | 90 | 100 |

| Tire | Ex.4-8 | Ex.4-9 | Ex.4-10 | Ex.4-11 | Ex.4-12 | Ex.4-13 | Ex.4-14 | Ex.4-15 |
|---|---|---|---|---|---|---|---|---|
| shoulder main groove width W2/crown main groove width W1 | 2.1 | 2.1 | 2.1 | 2.1 | 2.1 | 2.1 | 2.1 | 2.1 |
| middle axial groove width W4/crown main groove width W1 | 1.7 | 1.7 | 1.7 | 1.7 | 1.7 | 1.7 | 1.7 | 1.7 |
| shoulder main groove width W2/middle axial groove width W4 | 1.2 | 1.2 | 1.2 | 1.2 | 1.2 | 1.2 | 1.2 | 1.2 |
| shoulder axial groove minimum width W5/shoulder main groove width W2 | 1.1 | 1.1 | 1.1 | 1.1 | 1.1 | 1.1 | 1.1 | 1.0 |
| distance W9/a half tread width TW/2 (%) | 60 | 60 | 60 | 60 | 60 | 60 | 60 | 60 |
| (S1/2 + S2)/S3 shoulder block | 0.5 | 1.0 | 3.0 | 3.5 | 1.5 | 1.5 | 1.5 | 1.5 |
| minimum P1/maximum P2 | 0.8 | 0.8 | 0.8 | 0.8 | 0.5 | 0.7 | 1.0 | 1.1 |
| straight edge segment length ratio | 1.0 | 1.0 | 1.0 | 1.0 | 1.0 | 1.0 | 1.0 | 1.0 |
| length P3/distance P4 | 0.5 | 0.5 | 0.5 | 0.5 | 0.5 | 0.5 | 0.5 | 0.5 |
| center wear | 75 | 85 | 90 | 95 | 100 | 100 | 100 | 100 |
| early wear | N | N | N | Y | Y | N | N | N |
| wet performance | 100 | 100 | 100 | 100 | 115 | 110 | 95 | 90 |

| Tire | Ex.4-16 | Ex.4-17 | Ex.4-18 | Ex.4-19 | Ex.4-20 | Ex.4-21 | Ex.4-22 | Ex.4-23 |
|---|---|---|---|---|---|---|---|---|
| shoulder main groove width W2/crown main groove width W1 | 2.1 | 2.1 | 2.1 | 2.1 | 2.1 | 2.1 | 2.1 | 2.1 |
| middle axial groove width W4/crown main groove width W1 | 1.7 | 1.7 | 1.7 | 1.7 | 1.7 | 1.7 | 1.7 | 1.7 |
| shoulder main groove width W2/middle axial groove width W4 | 1.2 | 1.2 | 1.2 | 1.2 | 1.2 | 1.2 | 1.2 | 1.2 |
| shoulder axial groove minimum width W5/shoulder main groove width W2 | 1.0 | 1.1 | 1.1 | 1.1 | 1.1 | 1.1 | 1.1 | 1.1 |
| distance W9/a half tread width TW/2 (%) | 60 | 60 | 60 | 60 | 60 | 60 | 60 | 60 |
| (area S1/2 + area S2)/area S3 shoulder block | 1.5 | 1.5 | 1.5 | 1.5 | 1.5 | 1.5 | 1.5 | 1.5 |
| minimum P1/maximum P2 | 0.8 | 0.8 | 0.8 | 0.8 | 0.5 | 0.7 | 1.0 | 1.1 |
| straight edge segment length ratio | 0.7 | 0.9 | 1.3 | 1.7 | 1.0 | 1.0 | 1.0 | 1.0 |
| length P3/distance P4 | 0.5 | 0.5 | 0.5 | 0.5 | 0.1 | 0.3 | 0.7 | 0.9 |
| center wear | 85 | 90 | 90 | 85 | 100 | 100 | 100 | 100 |
| early wear | Y | N | N | Y | Y | N | N | N |
| wet performance | 100 | 100 | 100 | 100 | 110 | 100 | 90 | 85 |

As shown in Table 4-1, Embodiment tires can be improved in uneven wear and drainage.

Comparison Test 5

Based on the tread pattern shown in FIG. 1, test tires of size 11R22.5 (rim size: 22.5×8.25) having specifications listed in Table 5-1 were experimentally manufactured. In the comparative example tire Ref. 5-1, however, each middle shallow groove was not provided with the flared part in the end portion. The tires were tested as follows.

<Wear Test>

Embodiment 5-1 tires (as reference tire) were mounted on the rear wheels on one side of a 2-D wheel-type ten-ton truck and other test tires were mounted on the rear wheels on the other side, and the truck was run until the wear indicator of the reference tire or the test tire reached 50% wear. (Tire inflation pressure: 720 kPa)

Then, with respect to the test tire, the amount of wear of the crown blocks was obtained by measuring the block height at three circumferentially different measuring positions and subtracting the averaged measurements from the original block height. Similarly, the amount of wear of the shoulder blocks and the amount of wear of the middle blocks were obtained.

The ratio of the amount of wear of the crown blocks to the amount of wear of the shoulder blocks is indicated in the "center wear" section of Table 5-1, wherein the ratio closer to 1 is better.

Further, it was checked whether there was early wear or not by comparing the amount of wear of the shoulder blocks with those of the crown blocks and middle blocks. The results are indicated in the "early wear" section of Table 5-1, wherein "γ" means that early wear was observed, and "N" means that early wear was not observed.

<Wet Performance Test>

On an asphalt road surface covered with 5 mm depth water, the time required for the above-mentioned truck provided on all of the wheels with the same test tires to run for 10 meters was measured from the moment when the clutch was connected. Reciprocals of the measurements are indicated in Table 5-1 by an index based on Embodiment 5-1 being 100, wherein the larger the value, the better the wet performance.

TABLE 5-1

| Tire | Ref.5-1 | Ex.5-1 | Ex.5-2 | Ex.5-3 | Ex.5-4 | Ex.5-5 | Ex.5-6 | Ex.5-7 | Ex.5-8 |
|---|---|---|---|---|---|---|---|---|---|
| crown main groove width W1/shoulder main groove width W2 | 0.48 | 0.48 | 2.08 | 0.48 | 0.48 | 0.48 | 0.48 | 0.48 | 0.48 |
| distance W9/a half tread width TW/2 (%) | 60 | 60 | 60 | 50 | 75 | 60 | 60 | 60 | 60 |
| middle shallow groove flared part | N | Y | Y | Y | Y | Y | Y | Y | Y |
| distance L1/length L2 | — | 0.47 | 0.47 | 0.47 | 0.47 | 0.70 | 0.83 | 0.47 | 0.47 |
| angle γ (deg.) | — | 90 | 90 | 90 | 90 | 90 | 90 | 20 | 30 |
| maximum groove width L3 at the open end/length L2 | — | 0.33 | 0.33 | 0.33 | 0.33 | 0.33 | 0.33 | 0.33 | 0.33 |
| shortest distance L4/width L5 | — | 0.13 | 0.13 | 0.13 | 0.13 | 0.13 | 0.13 | 0.13 | 0.13 |
| center wear | 100 | 100 | 80 | 90 | 100 | 100 | 100 | 100 | 100 |
| early wear | N | N | N | N | N | N | N | N | Y |
| wet performance | 70 | 100 | 100 | 100 | 90 | 90 | 80 | 80 | 90 |

| Tire | Ex.5-9 | Ex.5-10 | Ex.5-11 | Ex.5-12 | Ex.5-13 | Ex.5-14 | Ex.5-15 | Ex.5-16 |
|---|---|---|---|---|---|---|---|---|
| crown main groove width W1/shoulder main groove width W2 | 0.48 | 0.48 | 2.08 | 0.48 | 0.48 | 0.48 | 0.48 | 0.48 |
| distance W9/a half tread width TW/2 (%) | 60 | 60 | 60 | 60 | 60 | 60 | 60 | 60 |
| middle shallow groove flared part | Y | Y | Y | Y | Y | Y | Y | Y |
| length L1/length L2 | 0.47 | 0.47 | 0.47 | 0.47 | 0.47 | 0.47 | 0.47 | 0.47 |
| angle γ (deg.) | 110 | 90 | 90 | 90 | 90 | 90 | 90 | 90 |
| maximum groove width L3 at the open end/length L2 | 0.33 | 0.17 | 0.20 | 0.50 | 0.67 | 0.33 | 0.33 | 0.33 |
| shortest distance L4/width L5 | 0.13 | 0.13 | 0.13 | 0.13 | 0.13 | 0.05 | 0.20 | 0.25 |
| center wear | 90 | 100 | 100 | 90 | 80 | 100 | 90 | 80 |
| early wear | N | N | N | N | Y | N | N | Y |
| wet performance | 100 | 80 | 90 | 100 | 100 | 90 | 100 | 100 |

As shown in Table 5-1, Embodiment tires can be improved in the uneven wear resistance.

The invention claimed is:

1. A heavy duty pneumatic tire comprising:
   a tread portion provided with circumferentially continuously extending main grooves and axial grooves connecting between the main grooves to form blocks,
   the main grooves including
   a zigzag crown main groove disposed on each side of the tire equator, and
   a zigzag shoulder main groove disposed axially outside each crown main groove,
   wherein the groove width of the crown main groove is less than the groove width of the shoulder main groove, and
   the axial grooves including
   crown axial grooves circumferentially dividing crown blocks disposed between the crown main grooves and each crown block having a substantially hexagonal shape, and
   middle axial grooves circumferentially dividing middle blocks disposed between each crown main groove and the adjacent shoulder main groove and each middle block having a substantially hexagonal shape,
   wherein the groove width of the middle axial grooves is more than the groove width of the crown axial grooves, wherein
   each of said crown block is provided with a crown shallow groove extending across a width of the tread thereof, and having a groove depth less than the groove depth of the crown axial grooves, and
   each of said middle block is provided with a middle shallow groove extending across a width of the tread thereof and having a groove depth less than the groove depth of the middle axial grooves,
wherein
each of said crown shallow groove comprises a central portion inclined to one direction with respect to the tire axial direction,
wherein
the crown axial grooves are inclined to one direction with respect to the tire axial direction which is opposite to that of said central portion of the crown shallow groove, and
each of said middle shallow groove comprises a central portion inclined to one direction with respect to the tire axial direction,
wherein
the middle axial grooves are inclined to one direction with respect to the tire axial direction which is opposite to that of said central portion of the middle shallow groove.

2. The heavy duty pneumatic tire according to claim 1, wherein
the middle blocks each have a maximum axial width, and the crown blocks each have a maximum axial width more than the maximum axial width of the middle blocks.

3. The heavy duty pneumatic tire according to claim 2, wherein
said one direction to which the crown axial grooves are inclined and said one direction to which the middle axial grooves are inclined are different from each other.

4. The heavy duty pneumatic tire according to claim 2, wherein
each of the crown main grooves and the shoulder main grooves has axially inwardly projecting parts and axially outwardly projecting parts which are alternate in the tire circumferential direction,
the crown axial grooves extend from the inwardly projecting parts of one of the crown main grooves to the inwardly projecting parts of the other crown main groove, while inclining at an angle in a range of from 10 to 20 degrees with respect to the tire axial direction, and
the middle axial grooves extend from the outwardly projecting parts of each of the crown main grooves to the inwardly projecting parts of the adjacent shoulder main grooves, while inclining at an angle in a range of from 10 to 20 degrees with respect to the tire axial direction.

5. The heavy duty pneumatic tire according to claim 1, wherein
said one direction to which the crown axial grooves are inclined, and said one direction to which the middle axial grooves are inclined are different from each other.

6. The heavy duty pneumatic tire according to claim 1, wherein
each of the crown main grooves and the shoulder main grooves has axially inwardly projecting parts and axially outwardly projecting parts which are alternate in the tire circumferential direction,
the crown axial grooves extend from the inwardly projecting parts of one of the crown main grooves to the inwardly projecting parts of the other crown main groove, while inclining at an angle in a range of from 10 to 20 degrees with respect to the tire axial direction, and
the middle axial grooves extend from the outwardly projecting parts of each of the crown main grooves to the inwardly projecting parts of the adjacent shoulder main, grooves, while inclining at an angle in a range of from 10 to 20 degrees with respect to the tire axial direction.

7. The heavy duty pneumatic tire according to claim 1, wherein
each of the crown main grooves and the shoulder main grooves comprises alternate first oblique segments and second oblique segments inclined with respect to the tire circumferential direction at inclination angles in a range of from 15 to 25 degrees.

8. The heavy duty pneumatic tire according to claim 1, wherein
each of said crown shallow grooves comprises two end portions disposed on both sides of the central portion, and inclined to one direction with respect to the tire axial direction which is the same as said one direction to which the central portion is inclined.

9. The heavy duty pneumatic tire according to claim 8, wherein
each end portion comprises a flared part in which the groove width increases toward its open end.

10. The heavy duty pneumatic tire according to claim 1, wherein
the middle shallow groove comprises two end portions disposed on both sides of the central portion, and inclined to one direction with respect to the tire axial direction which is opposite to that of the central portion.

11. The heavy duty pneumatic tire according to claim 10, wherein
each end portion comprises a flared part in which the groove width increases toward its open end.

12. The heavy duty pneumatic tire according to claim 11, wherein
the internal angle between the groove edges of the flared part of the middle shallow groove is not less than 30 degrees.

13. The heavy duty pneumatic tire according to claim 1, wherein
the axial grooves include shoulder axial grooves extending from each shoulder main groove to the adjacent tread edge to form shoulder blocks, and
the shoulder axial grooves have a groove width more than the groove width of the middle axial grooves.

14. The heavy duty pneumatic tire according to claim 1, wherein
the axial grooves include shoulder axial grooves extending from each shoulder main groove to the adjacent tread edge to form shoulder blocks,
the middle axial grooves have a first inclination angle with respect to the tire axial direction,
the crown axial grooves have a second inclination angle with respect to the tire axial direction,
the shoulder axial grooves have a third inclination angle with respect to the tire axial direction, and
the first inclination angle is less than the second inclination angle and more than the third inclination angle.

15. The heavy duty pneumatic tire according to claim 1, wherein
the lengths of edges of the tread of each crown block are set so that the edge length ratio between the lengths of any two of the edges of the tread falls within a range of from 0.8 to 1.3.

16. The heavy duty pneumatic tire according to claim 1, wherein
the crown main grooves have a first groove width,
the shoulder main grooves have a second groove width more than the first groove width,
the treads of the crown blocks have a first area,
the treads of the shoulder blocks have a second area less than the first area, and
at least one of the two groove edges of each shoulder axial groove comprises a straight portion extending straight from the shoulder main groove, and a curved portion extending from the axially outer end of the straight portion to the tread edge and curved to increase the groove width of the shoulder axial groove.

* * * * *